(12) United States Patent
Hui et al.

(10) Patent No.: US 6,359,935 B1
(45) Date of Patent: Mar. 19, 2002

(54) METHOD FOR ITERATIVE DEMODULATION AND DECODING FOR A SYSTEM WITH CODING AND DIFFERENTIAL DEMODULATION

(75) Inventors: Dennis Hui, Cary; Ali S. Khayrallah, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/317,782

(22) Filed: May 24, 1999

(51) Int. Cl.[7] .............................. H04L 32/02; H04L 5/12
(52) U.S. Cl. ....................... 375/262; 375/265; 375/341; 714/295; 714/796
(58) Field of Search ................................ 375/262, 265, 375/341; 714/786, 792, 794, 795, 701, 702, 780, 788, 796

(56) References Cited

U.S. PATENT DOCUMENTS

| 5,017,883 A | * | 5/1991 | Divsalar et al. | ............ 329/304 |
| 5,790,570 A | * | 8/1998 | Heegard et al. | ............ 714/755 |
| 5,812,601 A | * | 9/1998 | Schramm | .................... 375/262 |
| 6,034,997 A | * | 3/2000 | Mackenthun | ................ 375/265 |

OTHER PUBLICATIONS

Iterative Decoding of Coded and Interleaved Noncoherent Multiple Symbol Detected DPSK, M. Peleg. et al., Electronics Letters, Jun. 5, 1997.
An Intuitive Justification and a Simplified Implementation of the MAP Decoder for Convolutional Codes, A. Viterbi, IEEE, J. Selected Areas of Communications, Feb. 1998.
Iterative Decoding/Demodulation of Coded DPSK Systems, P. Hoeher.
Optimal Decoding of Linear Codes for Minimizing Symbol Error Rate, L. R. Bahl et al., IEEE Transactions on Information Theory, Mar. 1974.
A Viterbi Algorithm with Soft–Decision Outputs and its Applications, J. Hagenauer et al., 1989.
Multiple Symbol Differential Detection of MPSK, D. Divsalar, et al., IEEE Transactions on Communications, Mar. 1990.
Error Performance of Multiple–Symbol Differential Detection of PSK Signals Transmitted Over Correlated Rayleigh Fading Channels, P. Ho et al., IEEE Transactions on Communications, Oct. 1992.
Viterbi Decoding of Differentially Encoded PSK Signals Transmitted over Rayleigh Frequency–Flat Fading Channels. G. Vitetta et al., IEEE Transactions on Communications, Feb./Mar./Apr. 1995.
*Iterative Decoding/Demodulation of Coded DPSK Systems*, Peter Hoeher and John Lodge, IEEE Globecom 1998 (Cat. No. 98CH36250), Sydney, NSW, Australia, Nov. 8–12, 1998, pp. 598–603, vol. 1, XP002144693 1998, Piscataway, NJ, USA, ISBN: 0–7803–4984–9.
*Iterative Decoding of Coded and Interleaved Noncoherent Multiple Symbol Detected DPSK*, M. Peleg and S. Shamai, Electronics Letters, GB, IEE Stevenage, vol. 33, No. 12, Jun. 5, 1997 , pp. 1018–1020, XP000727043, ISSN: 0013–5194.

(List continued on next page.)

*Primary Examiner*—Chi Pham
*Assistant Examiner*—Phuong Phu
(74) *Attorney, Agent, or Firm*—Coat & Bennett, P.L.L.C.

(57) ABSTRACT

A receiver (300) for a communication device (102) includes a multiple symbol differential demodulator (304, 316) and a convolutional decoder (308) and a feedback loop (313). The feedback is used to improve the quality of the demodulation during a second pass through the demodulator. The demodulator has a trellis structure which reduces complexity.

28 Claims, 5 Drawing Sheets

OTHER PUBLICATIONS

*Decision–Feedback Differential Demodulation of Bit–Interleaved Coded MDPSK*, L.H.–J. Lampe and R. Schober, Electronics Letters, Dec. 9, 1999, IEE, UK, vol. 35, No. 25, pp. 2170–2171, XP002144754, ISSN: 0013–5194.

Proakis, Digital Communications, 1995, pp. 483–486.*
Divsalar et al, "Multiple–Symbol Differential Detection of MPSK", IEEE Transactions on Communications, 1990, pp. 300–308.*

* cited by examiner

| ROW | DATA BIT | | | | | | | | |
|---|---|---|---|---|---|---|---|---|---|
| 0. | C220 | C219 | C218 | C233 | C232 | C231 | C211 | C210 | C209 | C208 |
| 1. | C0 | C25 | C50 | C75 | C100 | C125 | C150 | C175 | C200 | C237 |
| 2. | C1 | C26 | C51 | C76 | C102 | C126 | C151 | C176 | C201 | C224 |
| 3. | C2 | C27 | C52 | C77 | C102 | C127 | C152 | C177 | C202 | C236 |
| 4. | C3 | C28 | C53 | C78 | C103 | C128 | C153 | C178 | C203 | C223 |
| 5. | C4 | C29 | C54 | C79 | C104 | C129 | C154 | C179 | C204 | C235 |
| 6. | C5 | C30 | C55 | C80 | C105 | C130 | C155 | C180 | C205 | C222 |
| 7. | C6 | C31 | C56 | C81 | C106 | C131 | C156 | C181 | C206 | C234 |
| 8. | C7 | C32 | C57 | C82 | C107 | C132 | C157 | C182 | C207 | C221 |
| 9. | C8 | C33 | C58 | C83 | C108 | C133 | C158 | C183 | C250 | C249 |
| 10. | C9 | C34 | C59 | C84 | C109 | C134 | C159 | C184 | C217 | C216 |
| 11. | C10 | C35 | C60 | C85 | C110 | C135 | C160 | C185 | C248 | C247 |
| 12. | C11 | C36 | C61 | C86 | C111 | C136 | C161 | C186 | C215 | C230 |
| 13. | C12 | C37 | C62 | C87 | C112 | C137 | C162 | C187 | C246 | C245 |
| 14. | C13 | C38 | C63 | C88 | C113 | C138 | C163 | C188 | C229 | C228 |
| 15. | C14 | C39 | C64 | C89 | C114 | C139 | C164 | C189 | C244 | C259 |
| 16. | C15 | C40 | C65 | C90 | C115 | C140 | C165 | C190 | C214 | C213 |
| 17. | C16 | C41 | C66 | C91 | C116 | C141 | C166 | C191 | C258 | C257 |
| 18. | C17 | C42 | C67 | C92 | C117 | C142 | C167 | C192 | C212 | C227 |
| 19. | C18 | C43 | C68 | C93 | C118 | C143 | C168 | C193 | C243 | C242 |
| 20. | C19 | C44 | C69 | C94 | C119 | C144 | C169 | C194 | C226 | C225 |
| 21. | C20 | C45 | C70 | C95 | C120 | C145 | C170 | C195 | C241 | C256 |
| 22. | C21 | C46 | C71 | C96 | C121 | C146 | C171 | C196 | C240 | C239 |
| 23. | C22 | C47 | C72 | C97 | C122 | C147 | C172 | C197 | C255 | C254 |
| 24. | C23 | C48 | C73 | C98 | C123 | C148 | C173 | C198 | C238 | C253 |
| 25. | C24 | C49 | C74 | C99 | C124 | C149 | C174 | C199 | C252 | C251 |

*FIG. 9*

METHOD FOR ITERATIVE DEMODULATION AND DECODING FOR A SYSTEM WITH CODING AND DIFFERENTIAL DEMODULATION

BACKGROUND

The present invention is generally related to communication devices. More particularly, the present invention is related to a method for iterative demodulation and decoding for a system with coding and differential modulation and demodulation.

Digital radio systems employ channel coding and digital modulation of a carrier signal. Data to be transmitted include data representative of speech and control information. The data is encoded in a standardized format, with bits being placed in predetermined locations in the data stream and additional bits added for reliability. The encoded data stream is used to modulate a carrier signal, for example, using differential quadrature phase shift keying (DQPSK) and transmitted to a remote location. In a time division multiple access (TDMA) system, data is transmitted in a sequence of bursts.

A receiver which receives the transmitted signal performs essentially the reverse process. The modulated signal is demodulated and the encoded is decoded. Also, a reliability check is performed to determine that the data have been accurately received and decoded. If not, the transmission is rejected and a new burst is processed.

Previous receivers have used coherent demodulation for demodulating the signal. In coherent demodulation, the demodulator makes an estimate of the channel between the transmitter and the receiver and a hypothesized value of the received data is prepared. The actual received data are compared to the hypothesized data to determine reliability.

The major drawback of coherent demodulation is that it requires complicated mechanisms for tracking both the magnitude attenuation and the phase rotation induced by the channel. A coherent demodulator introduces substantial complexity into the receiver. Along with complexity, a coherent demodulator is relatively expensive to implement.

One alternative is differential demodulation, which is simpler and therefore cheaper to implement. However, differential demodulators perform significantly worse than coherent demodulators do.

Accordingly, there is a need for a demodulator which provides the performance advantages of a coherent demodulator without the complexity required for performing a channel estimate.

DETAILED DESCRIPTION OF THE INVENTION

Figure 1:
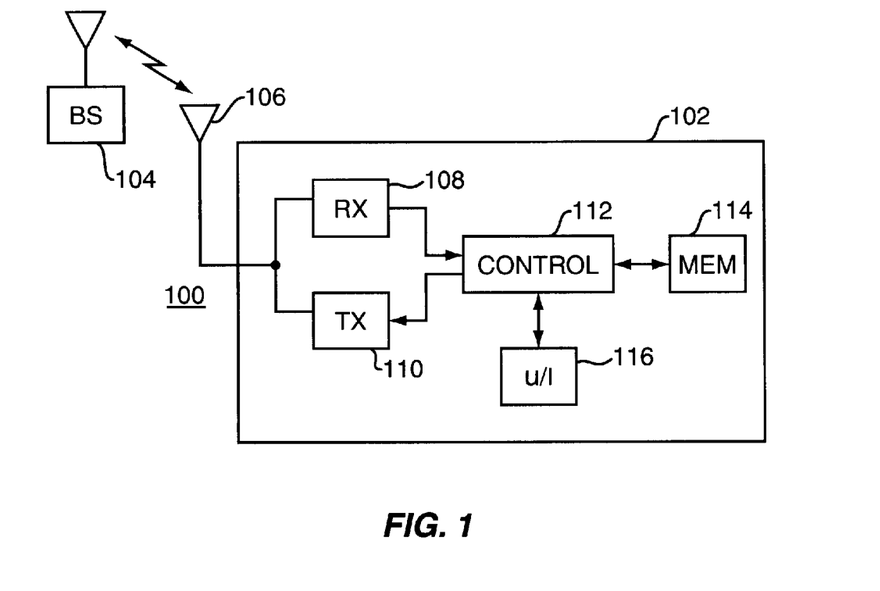
FIG. 1 is a block diagram of a radio communication system.

Referring now to the drawing, FIG. 1 is a block diagram of a communication system 100. The communication system 100 includes a radiotelephone 102 and a remote base station 104 which are configured to be in radio communication. The base station 104 may be part of a cellular telephone system, personal communication system (PCS), trunked radio system or other radio communication system. The base station 104 provides communication with other infrastructure equipment such as other base stations and switches (not shown) in the system 100. The base station 104 includes a receiver and transmitter for providing two-way radio communication with mobile radios in an area adjacent to the base station 104.

The radiotelephone 102 is one such radio and is configured for radio communication with the base station 104. The radiotelephone 102 includes an antenna 106, a receiver 108, a transmitter 110, a controller 112, a memory 114 and a user interface 116. The antenna 106 receives radio frequency (RF) signals transmitted by the base station 104. The receiver 108 demodulates and decodes the RF signals to produce digital data which is conveyed to the controller 112. The digital data may correspond to voice signals, data and control information. The controller 112 controls operation of the radiotelephone 102 and may be implemented as a microprocessor or microcontroller which is responsive to instructions and data stored in the memory 114. For transmission of data to the base station 104, the controller 112 provides digital data to the transmitter 110. The transmitter 110 encodes the data into a data steam and uses the data stream to modulate a carrier signal. The modulated carrier is provided to the antenna 106 and transmitted to the base station 104. The user interface 116 provides control of the radiotelephone 102 by a user and typically includes a keypad, a display, a speaker and a microphone.

As noted above, one embodiment of the system 100 is a cellular or PCS communication system. In the illustrated embodiment, the system 100 operates according to IS-136 EIA/TIA Cellular System Dual-Mode Mobile Station—Base Station Compatibility Standard (IS-136). IS-136 is an industry standard which specifies operational requirements and parameters for devices including receivers and transmitters operating in the system 100 to ensure reliable communication in the system 100. While the present embodiment is illustrated as an IS-136 system, the illustrated techniques could be applied to any suitable present or future generation digital radio system using differential modulation, such as differential quadrature phase shift keying (DQPSK).

Figure 2:
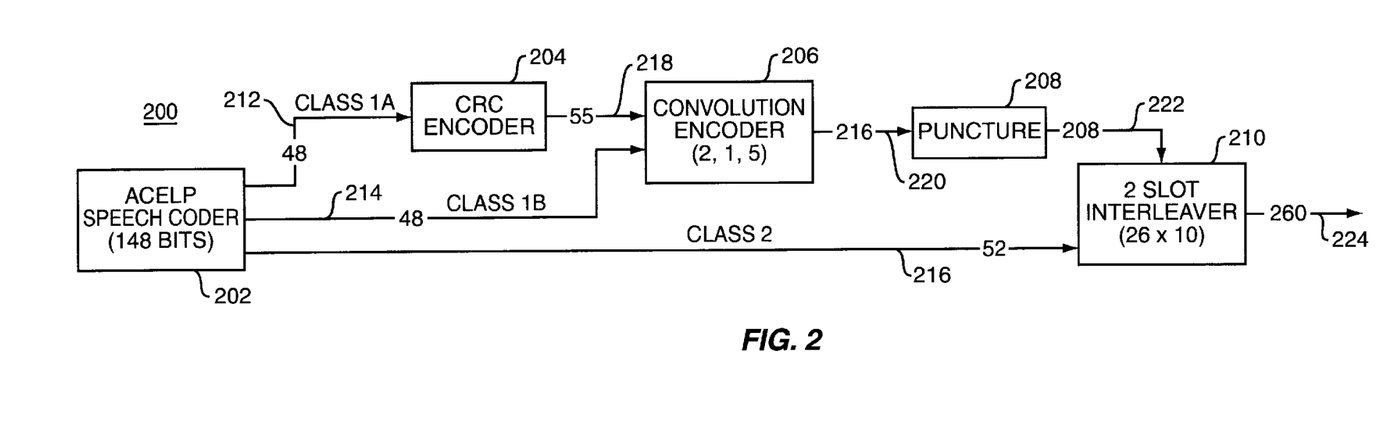
FIG. 2 is a block diagram of a portion of a transmitter for use in the radio communication system of FIG. 1.

FIG. 2 is a block diagram of a portion of a transmitter 200 for use in the system 100 of FIG. 1. The transmitter 200 may be located at either the base station 104 or the radiotelephone 102 of the system 100. The transmitter 200 includes a speech coder 202, a cyclical redundancy check (CRC) encoder 204, a convolution encoder 206, a puncture processor 208 and an interleaver 210. A fully functional transmitter for use in the system includes other components which are not shown in FIG. 2, such as a carrier generator and a modulator. The components of the transmitter 200 illustrated in FIG. 2 format a data stream necessary for modulating a carrier. Data are transmitted by the transmitter 200 in bursts, as specified by IS-136. Each burst occupies 20/3=6.67 ms and contains 260 bits of data. A frame consists of three bursts and occupies 20 ms. In effect, 20 ms of speech are compressed into one 6.67 ms burst.

The speech coder 202 converts analog signals representative of voice to digital data representative voice. In the illustrated embodiment, and consistent with IS-136, the speech coder 202 is an algebraic code excited linear predictive (ACELP) coder, as is well known in the art. The speech coder 202 produces a block of 148 bits of speech data per burst.

In accordance with IS-136, different bits from the speech coder 202 are classified differently. Ninety-six bits are considered high priority bits and classified as class 1 bits. Of those, forty eight of the highest priority bits are classified as class 1A bits 212 and forty eight of the next lowest priority bits are classified as class 1B bits 214. The remaining 52 bits are classified as class 2 bits 216. Bit classification is established by IS-136 and is related to the speech quality significance of the bits.

Different classes of bits get processed differently. Class 1A bits 212 are provided to the CRC encoder 204 which appends a 7-bit CRC code to the class 1A bits, producing fifty five CRC class 1A bits 218. The CRC class 1A bits 218 and the class 1b bits 214 are provided to the convolutional encoder 206. The convolutional encoder 206 encodes the bits in a predetermined format and includes additional bits to ensure reliability. For example, the convolutional encoder 206 adds some redundant bits to increase the likelihood of the receiver accurately detecting the bits upon reception of a burst. The convolutional encoder 208 provides as its output two hundred and sixteen encoded class 1 bits 220. The puncture processor 208 drops some of the encoded class 1 bits 220 to produce two hundred and eight bits of punctured data 222.

The interleaver 210 combines the punctured data 222 and the class 2 bits 216. In accordance with IS-136, the combined data are interleaved over two transmission bursts or slots. One-half of the bits from the current speech block are combined with one-half of the bits from a previous speech block. The remaining one-half of the bits from the current block are retained for the next transmission burst for combination with bits from the next block. Interleaving improves the reliability of the data transmission.

Figure 9:
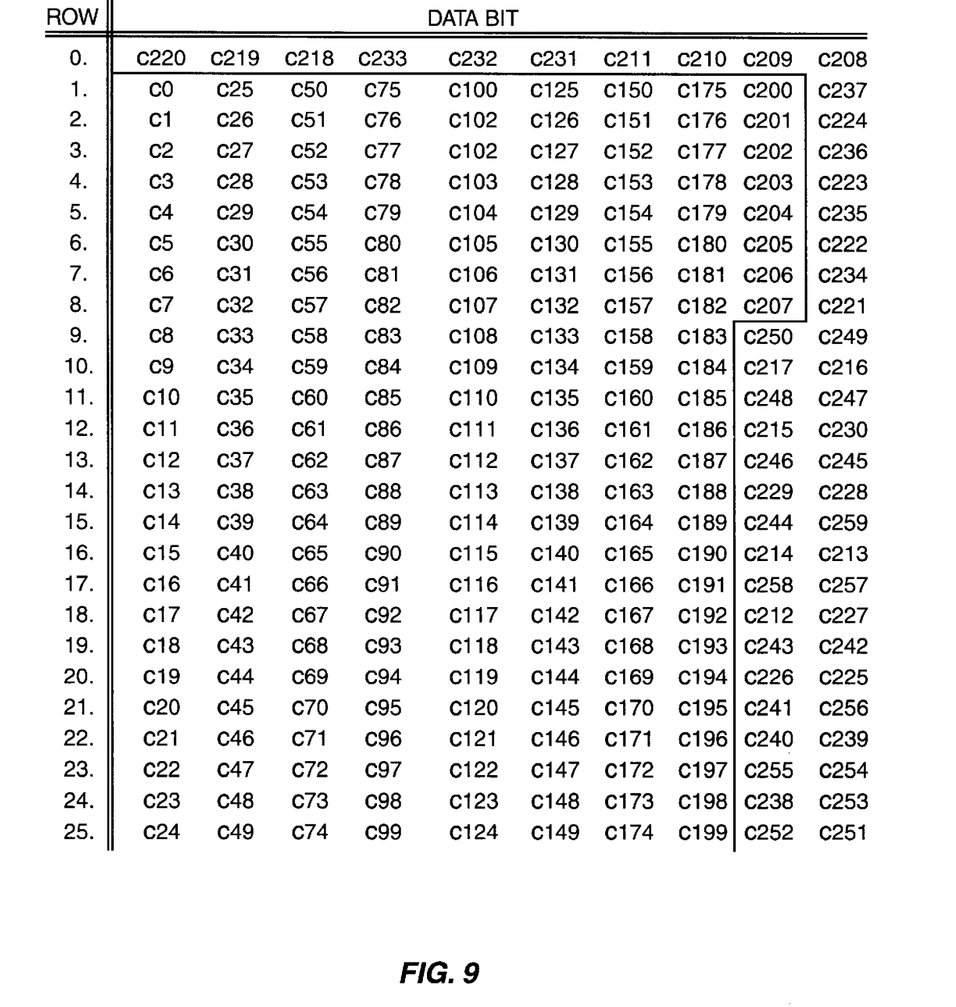
FIG. 9 is a table illustrating bit interleaving in accordance with a prior art speech coding standard.

More precisely, the punctured data 222 and the Class 2 bits 216 distribute themselves according to the interleaving shown in Table 1, FIG. 9, taken from the IS-641 standard for the Algebraic Code Excited Linear Predictive (ACELP) speech coder. The notation cn denotes the $n^{th}$ bit of the 260 bit voice data frame, which includes both coded Class 1 bits and the uncoded Class 2 bits. Bits c(0 . . . 207) represent the coded Class 1 bits, and bits c(208 . . . 259) represent the uncoded Class 2 bits. Table 1 has been partitioned to separate the Class 1 and Class 2 bits. The Class 2 bits are on the top and to the left of the partition, and the Class 1 bits are below and to the right of the partition. The bits are read into this array according to their bit index as shown, and they are read out row by row for transmission. The data payload part of the current transmission burst or slot is formed by reading an even row from a similar array filled with data from the previous speech block, then reading an odd row from the array filled with the current speech block. This alternation continues in a row by row fashion until the 260 bits of data payload is formed, and then it is transmitted with the other control information bits in the current slot. From the standpoint of a block of speech data, odd rows can be transmitted immediately in the current frame while the even rows must wait for the next frame 20 ms later.

The output of the interleaver 210 is a data burst 224 which is 260 bits long. The data burst 224 is used to modulate a carrier signal. Various modulation techniques, such as quadrature phase shift keying (QPSK) and gaussian mean shift keying (GMSK) may be used. In the illustrated embodiment, and in accordance with IS-136, $\pi/4$ differential QPSK (DQPSK) modulation is used. DQPSK modulation is well known in the art.

Figure 3:
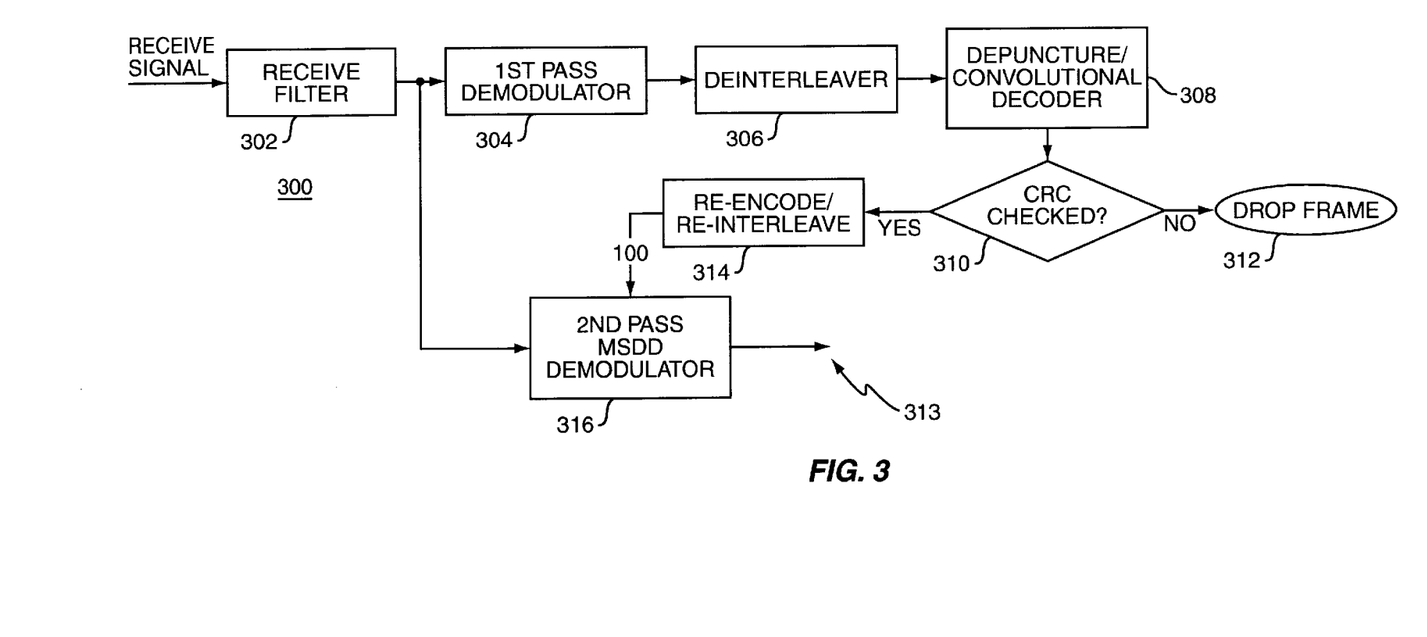
FIG. 3 is a block diagram of one embodiment of a receiver for use in the radio communication system of FIG. 1.

FIG. 3 is a block diagram of a first embodiment of a portion of a receiver 300 for use in the system 100 of FIG. 1. The receiver 300 may be used in either the base station 104 or the radiotelephone 102 of the system 100. However, the receiver 300 offers particular advantages of reduced complexity, size, current drain and cost which makes it particularly well suited to use in a mobile station such as the radiotelephone 102.

It is to be noted that, in some embodiments the components of the receiver 300 may preferably be implemented as software programs for execution by a microprocessor, microcontroller, digital signal processor or other processor. Many of the signals conveyed between theses components comprise digital data which is well suited to such processing. In other embodiments, it may be preferable to implement one or more components as hardware or as a combination of hardware and software.

The receiver 300 includes a receive filter 302, a first pass demodulator 304, a deinterleaver 306, a convolutional decoder 308, a CRC verifier 310, a re-encoder 314 and a second pass demodulator 316. The receive filter 302 filters extraneous signals which may be introduced during transmission over the wireless link, down mixing or other processing.

The first pass demodulator 304 receives the input signal from the receive filter 302. The first pass demodulator 304 is configured to demodulate the input signal to produce output data. The first pass demodulator 304 is preferably a multiple symbol differential demodulator (MSDD). In the illustrated embodiment, the first pass demodulator 304 is implemented as a software program for controlling a digital processor. Alternatively, hardware may be implemented to equivalently perform some or all of the functions of the software implementation, which is described below. Typically, the first pass demodulator 304 operates on a single slot of data, corresponding to 6.67 ms transmission time. The operation of the first pass demodulator 304 will be described in detail below.

The deinterleaver 306 combines data bits from subsequent slots to reproduce the data for each burst as it was originally formatted at the transmitter.

Further, the deinterleaver identifies and separates class 1 bits from class 2 bits based on the bit position in the bit stream.

The convolutional decoder 308 is coupled to the first pass demodulator 304 through the deinterleaver and is configured to decode the output data provided by the first pass demodulator 304. The convolutional decoder 308 decodes the bit stream and separates the class 1A bits from the class 1B bits. The CRC verifier 310 extracts the CRC bits from the bit stream received from the convolutional decoder 308 and performs a CRC check. If the CRC check does not verify, the frame of data will be dropped, as indicated at 312. If the CRC check does verify, the data stream is re-encoded and re-interleaved by the re-encoder 314.

The re-encoded (Class 1) bits that are available for the second pass re-demodulation upon successful demodulation and CRC check on the first pass are shown in bold in Table 1, FIG. 9. These bits total 100 bits. For the third-pass demodulation, the rest of the Class 1 bits shown in Table 1 will also be available, which add up to a total of 208 bits.

The second pass demodulator 316 receives the input signal from the receive filter 302 and the class 1 bits from the re-encoder 314. In the preferred embodiment, the second pass demodulator 316 duplicates the operation of the first pass demodulator 304 but with improved accuracy and reduced complexity due to the class 1 bits received from the re-encoder 314. The first and second pass demodulators may be implemented using a single software routine which performs the functions of both demodulators for a single slot. The CRC verifier 310 and the re-encoder 314 in this implementation form a feedback loop from the convolutional decoder 308 to the demodulator.

The class 1 bits provided to the second pass demodulator 316 by the decoder 308 allow the second pass demodulator to improve the quality of the demodulation of the input signal. In a manner to be described in further detail below in connection with FIGS. 6–8, the second pass demodulator 316 uses the class 1 bits to improve its likelihood of selecting the correct value for the data being demodulated. The class 1 bits are well suited to this purpose because they have received the best protection against errors, including CRC encoding and convolutional encoding. If the decoder can successfully and reliably decode the class 1 bits, those decoded bits may serve as a metric of the decoding process and can be used to demodulate the remainder of the bits in the input data stream. The decoder 308 thus provides reliability information to the demodulator for demodulation of the input signal. For the current speech block, the second pass demodulation improves those Class 2 bits that correspond to the even rows of Table 1 (FIG. 9), a total of 30 bits. The second pass demodulation also improves those Class 1 and Class 2 bits of the next speech block that correspond to the odd rows in Table 1, a total of 108 Class 1 bits and 22 Class 2 bits).

Figure 4:
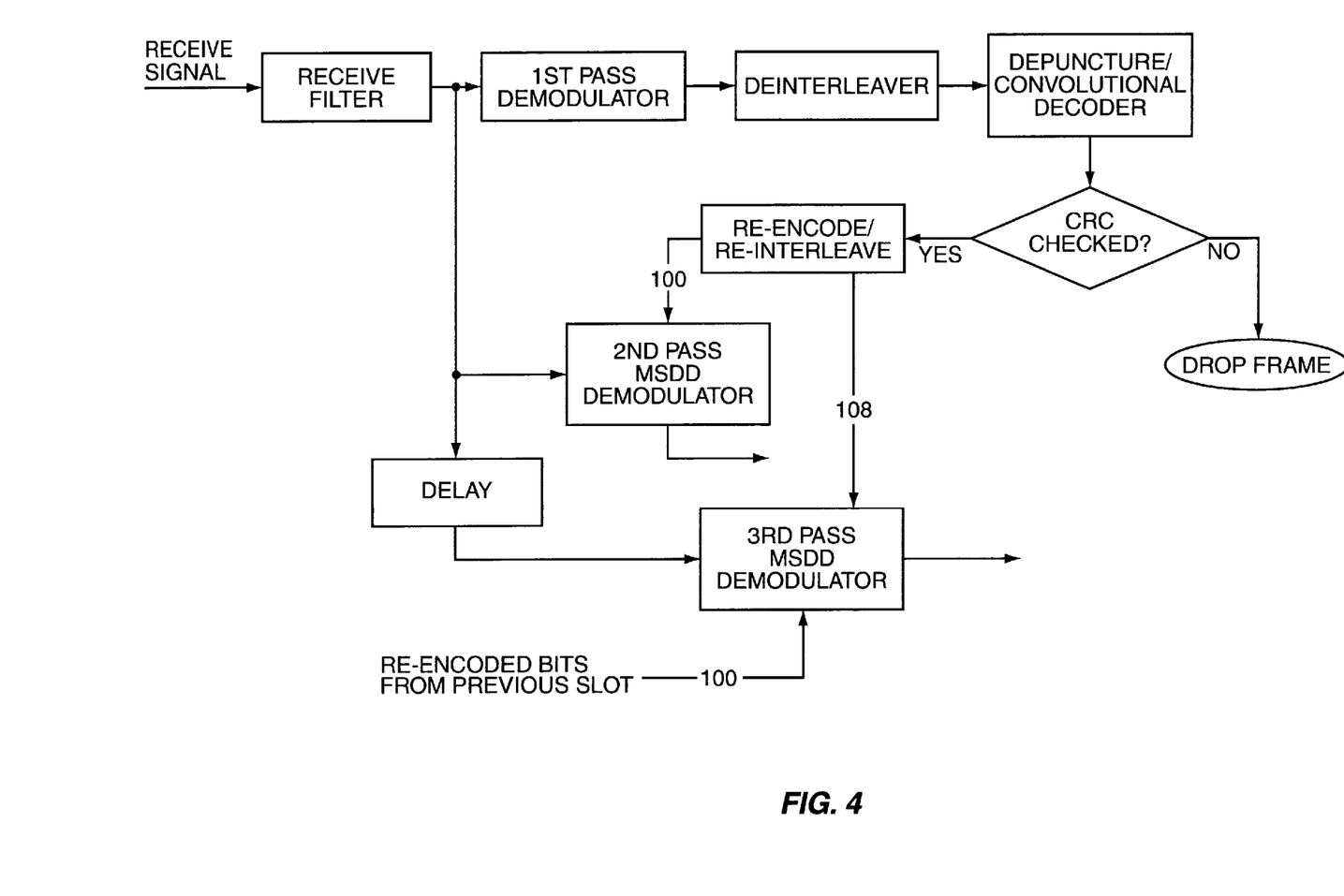
FIG. 4 is a block diagram of a second embodiment of a receiver for use in the radio communication system of FIG. 1.

FIG. 4 shows an alternative embodiment of the receiver 300. In the embodiment of FIG. 4, the receiver includes a receive filter 302, a first pass demodulator 304, a deinterleaver 306, a convolutional decoder 308, a CRC verifier 310, a re-encoder 314 and a second pass demodulator 316. These functional blocks operate as described above in conjunction with the embodiment illustrated in FIG. 3. In addition, the embodiment of FIG. 4 further includes a delay block 318 and a third pass demodulator 320.

As noted above, in accordance with IS-136, data is interleaved among subsequent bursts. Each slot or burst of data, having a duration of 6.67 ms, contains one-half the bits of the current burst and one-half the bits of the previous burst. Interleaving decreases the error rate and improves reliability. In the two-pass demodulator of FIG. 3, the decoder 308 only has one-half of the class 1 bits for the current slot and therefore can give to the second pass demodulator 316 reliability information for one-half the bits being demodulated. To improve the performance of the receiver 300, a third pass demodulation leg including the delay block 318 and third pass demodulator 320 are added.

The third pass demodulator 320 in the illustrated embodiment comprises a multiple symbol differential demodulator. Preferably, the third pass demodulator 320 is implemented as a software program code or code portion and may be the same portion of code as the first pass demodulator 304 and the second pass demodulator 316. The third pass demodulator 320 thus operates substantially the same as the other demodulator sections but at a different time and using different input data, for example, from a subroutine call.

The third pass demodulator 320 receives a delayed version of the input signal from the delay block 318, 108 re-encoded bits from the re-encoder 314, and 100 re-encoded bits from the previous time slot or burst. The 100 bits from the previous burst were provided from the decoder 308 to the second pass demodulator 316 during demodulation of the previous burst and then stored for use during the current burst. The output of the third pass demodulator 320 is the demodulated data bits for the current frame.

The delay block 318 delays the input signal by an appropriate amount to align the 108 decoded and re-encoded class 1 bits from the current burst and the 100 re-encoded bits from the previous burst with the current input signal. In an IS-136 implementation, the delay introduced by the delay block 318 is approximately 20 ms, the duration of one frame. A shift register or any other suitable data storage element may be used for the delay block 318.

Only the quality of Class 2 bits is improved through the third pass demodulation since all Class 1 bits must have passed the CRC check in order for the third pass demodulation to be engaged. Those Class 2 bits (a total of 22 bits) that are on the odd rows can receive the benefit of third pass demodulation without any (20 ms) time delay. The rest of the Class 2 bits (i.e., those that are on the even rows) can receive the benefit of third pass demodulation only at the expense of a 20 ms delay.

The present embodiments illustrated in FIGS. 3 and 4 form a communications receiver that performs iterative demodulation and decoding between a trellis-structured MSDD demodulator as described below and a convolutional decoder. Soft information of the coded class 1 bits is passed from the trellis-structured MSDD to the convolutional decoder, though hard data can also be generated from the demodulator. Operation of the MSDD demodulator will next be described, followed by description of a method of generating soft information from the demodulator. Then, a method of re-demodulation using the trellis-structured MSDD with the re-coded bits fed back from the decoder is described.

An optimal MSDD of the π/4-DQPSK modulation for a flat Rayleigh fading channel is now described. Let $r_k$ denote the discrete-time received samples at time k, let $s_k$ denote the corresponding transmitted symbol, and let $d_k$ denote the differential (i.e. information bearing) symbol such that $s_k = d_k s_{k-1}$ and that $d_k \in \{e^{j\pi/4}, e^{j3\pi/4}, e^{-j3\pi/4}, e^{-j\pi/4}\}$. If $\hat{d}_k$ denotes an estimate for $d_k$, then the metric for an optimal MSDD demodulator of block length N is given by $$M_N = \text{Re}\left\{ \sum_{n=1}^{N} \sum_{m=0}^{n-1} \beta_{n,m} r_n r_m^* \prod_{k=m+1}^{n} \hat{d}_k^* \right\}, \tag{1}$$

where each $\beta_{n,m}$ depends on the Doppler spread and the noise level of the channel. The Doppler spread is a frequency variation introduced to the input signal by motion of the receiver relative to the transmitter. The Doppler spread of the received signal increases with increasing velocity of the receiver. The output of the MSDD demodulator is the sequence of differential symbols $\{\hat{d}_k\}$ that maximizes $M_N$. To find this maximal sequence an optimal MSDD demodulator needs to calculate the metric in equation (1) for every differential symbol sequence of length N. Note that N+1 received samples $\{r_k\}_{k=0}^N$ are used to detect N differential symbols $\{d_k\}_{k=1}^N$ In words, the metric $M_N$ is simply the real part of a weighted sum of all correlations $r_n r_m^*$, rotated correspondingly by the cumulative differential phase estimates, between any two received samples $r_n$ and $r_m$ that lie within the block of N+1 samples. When there is no Doppler spread, the weights $\{\beta_{n,m}\}$ are all identical. For a non-zero Doppler speed, $\beta_{n,m}$ tends to weigh down the contributions due to received pairs that are far apart. Also, this tendency becomes more pronounced as the Doppler spread increases.

As indicated above, the optimal MSDD of equation (1) requires substantial computational resources. This requirement is incompatible with reduced complexity, so a simpler approximation is preferred.

The proposed MSDD demodulator attempts to approximate the optimal metric in equation (1) by the following:

$$M_N' = \text{Re}\left\{\sum_{n=1}^{N} \sum_{m=\max(0,n-L)}^{n-1} \alpha^{n,m} r_n r_m^* \prod_{k=m+1}^{n} \hat{d}_k^*\right\} \quad (2)$$

where the value of $\alpha$ is related to $\beta_{n,m}$ of equation (1) and is between 0 and 1, and L is a positive integer from 1 to infinity. $\alpha$ can be referred to as the forgetting factor and L as the correlation span of the demodulator. Both quantities can be predetermined and stored in advance for various Doppler spreads and be accessed in a table-lookup manner. The receiver 300 may include a Doppler spread circuit which estimates the Doppler spread of the received signal. The Doppler spread estimate is used to look up the forgetting factor and correlation span values from a table of predetermined values. Alternatively, a single choice of $\alpha$ and L can be made that will produce very good results over a large range of Doppler spread values.

According to the value of L, consider two cases, namely when L is infinite and when L is finite. The demodulator for the case of $L=\infty$ is easier to implement while the demodulator with $L<\infty$ yields better performance when the parameters (i.e. $\alpha$ and L) are chosen properly.

When $L=\infty$, for any sequence of differential symbol estimates $\{\hat{d}_n\}_{n=1}^N$, the metric in equation (2) can be computed recursively as $$M_n' = M_{n-1}' + \text{Re}\{B_n'\}, \quad (3a)$$

where $$B_n' = r_n r_{n-1}^* \hat{d}_n^*\left(1 + \frac{\alpha}{|r_{n-1}|^2} B_{n-1}'\right) \quad (3b)$$

with initial conditions $M_0'=0$ and $B_0'=0$.

Figure 5:
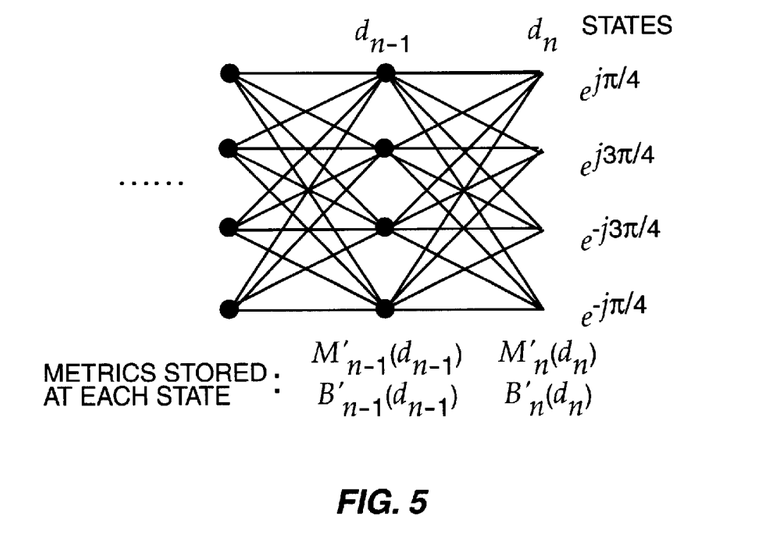
FIG. 5 is a trellis diagram of a portion of a multiple symbol differential demodulator.

The demodulator blocks of FIGS. 3 and 4 use $M_n'$ as the path metric and $B_n'$ as the branch metric in a Viterbi decoder to search for a sequence estimate $\{\hat{d}_n\}_{n=1}^N$. Referring to FIG. 5, it shows the trellis structure of a portion of a demodulator in accordance with the present embodiment. Specifically, the associated trellis has four states. Each state corresponds to one of the four possible DQPSK differential symbols, as shown in FIG. 5. The trellis structure includes a plurality of sequential stages. Each stage has a plurality of possible states corresponding to differential symbols $e^{j\pi/4}$, $e^{j3\pi/4}, e^{-j3\pi/4}, e^{-j\pi/4}$. Each stage has four incoming branches and four outgoing branches.

In operating the Viterbi decoder, two quantities, namely $M_n'$ and $B_n'$, are associated with each state at each stage n, and they are updated from stage to stage according to equations (3a) and (3b). More precisely, let A denote the set of states, let $\hat{d}_n$ be one of the states at stage n, and let $M_n'(\hat{d}_n)$ and $B_n'(\hat{d}_n)$ denote the two quantities associated with the state $\hat{d}_n$. Then $M_m'(\hat{d}_k)$ is updated at stage n as $$M_n'(\hat{d}_n) = \max_{\hat{d}_{n-1} \in A}\{M_{n-1}'(\hat{d}_{n-1}) + \text{Re}\{B_n^{cand}(\hat{d}_{n-1}, \hat{d}_n)\}\} \quad (4a)$$

and $B_n'(\hat{d}_n)$ is updated as $$B_n'(\hat{d}_n) = {}_n^{cand}(\tilde{d}_{n-1}, \hat{d}_n), \quad (4b)$$

where $$B_n^{cand}(\hat{d}_{n-1}, \hat{d}_n) = r_n r_{n-1}^* \hat{d}_n^*\left(1 + \frac{\alpha}{|r_{n-1}|^2} B_{n-1}'(\hat{d}_{n-1})\right), \quad (4c)$$

and $$\tilde{d}_n = \underset{\hat{d}_{n-1} \in A}{\text{argmax}}\{M_{n-1}'(\hat{d}_{n-1}) + \text{Re}\{B_n^{cand}(\hat{d}_{n-1}, \hat{d}_n)\}\}. \quad (4d)$$

The above recursion of equations (4a)–(4d) proceeds from stage to stage until the final stage N is reached. If hard decisions are desired, the path that corresponds to the maximum value of $M_N'$ at the final stage is traced back, and the corresponding sequence $\{\hat{d}_n\}_{n=1}^N$ becomes the output of the demodulator.

In a fast fading channel where the phase variation of the channel can be rather significant, correlations of received samples separated by a long time periods may adversely affect the decisions of the receiver. To reduce this effect in the above algorithm, the present embodiment uses a small forgetting factor $\alpha$. However, using a small $\alpha$ restricts the contribution of the correlations of neighboring received samples. To mitigate this conflict, we drop the contribution of correlation $r_n r_{n-m}^*$ of received samples separated by more than, say, L samples, when calculating the branch metric recursively. This can be done as described in the following.

For any sequence of differential symbol estimates $\{_n\}_{n=1}^N$, the metric in equation (2) can be written as $$M_N' = M_{N-1}' + \text{Re}\{B_N w^T\}, \quad (5a)$$

where $w = (1 \; \alpha \; \alpha^2 \; \ldots \; \alpha^{L-1})$ and $$B_n = \left(r_n r_{n-1}^* \hat{d}_n^*, r_n r_{n-2}^* \hat{d}_n^* \hat{d}_{n-1}^*, \ldots, r_n r_{n-L}^* \prod_{k=n-L+1}^{n} \hat{d}_k^*\right),$$

assuming that $N \geq L$. If $N<L$, some of the elements in $B_N$ are replaced by zeros instead. The vector $B_N$ may be stored in a shift register of length L, with each memory slot of the shift register containing one component of $B_N$. To obtain $B_N$ from $B_{N-1}$, the contents of this shift register can be recursively updated as follows. We first divide the contents of the shift register storing $B_{N-1}$ by $|r_{N-1}|^2$, and then shift the contents of the register so that the contents of its last slot are dropped while the contents of the first slot are replaced by 1. Finally, we multiply the contents of each slot by $r_N r_{N-1}^* \hat{d}_N^*$. These update operations of $B_N$ can be summarized in the following matrix form:

$$B_N = r_N r_{N-1}^* \hat{d}_N^* \times [1 | r_{N-1}|^{-2} B_{N-1}] \times \begin{bmatrix} I_L \\ 0_{1 \times L} \end{bmatrix}, \quad (5b)$$

where $I_L$ denotes an L×L identity matrix and $0_{1 \times L}$ denotes a 1×L zero vector.

As in the case of infinite correlation span, the demodulator of the invention for the case of finite correlation span uses the same trellis to search for a sequence estimate $\{\hat{d}_n\}_{n=1}^N$. With each state at each stage n, we now associate $M_n'$, and $B_n$, which are updated recursively using equations (5a) and (5b). More precisely, the two quantities, $M_n'(\hat{d}_n)$ and $B_n(\hat{d}_n)$, associated with state $\hat{d}_n$ at stage n are updated by $$M_n'(\hat{d}_n) = \max_{\hat{d}_{n-1} \in A} \{M_{n-1}'(\hat{d}_{n-1}) + \text{Re}\{B_n^{cand}(\hat{d}_{n-1}, \hat{d}_n) w^T\}\} \quad (4a)$$

and $$B_n(\hat{d}_n) = B_n^{cand}(\hat{d}_{n-1}, \hat{d}_n), \quad (4b)$$

where $$B_k^{cand}(\hat{d}_{k-1}, \hat{d}_k) = r_k r_{k-1}^* \hat{d}_k^* \times [1 | r_{N-1}|^{-2} B_{N-1}(\hat{d}_{k-1})] \times \begin{bmatrix} I_L \\ 0_{1 \times L} \end{bmatrix} \quad (4c)$$

and $$\tilde{d}_n = \arg\max_{\hat{d}_{n-1} \in A} \{M_{n-1}'(\hat{d}_{n-1}) + \text{Re}\{B_n^{cand}(\hat{d}_{n-1}, \hat{d}_n) w^T\}\}. \quad (4d)$$

When the final stage is reached, hard decisions on the differential symbols can be made in the same manner as before. Note that the weights w can be chosen to be any values and stored in advance. It is not necessary for them to be in the form of $w = (1 \ \alpha \ \alpha^2 \ \ldots \ \alpha^{L-1})$ for some $\alpha$ in order for the above algorithm to operate properly.

The present implementation provides for generation of both soft information and hard information by the MSDD demodulator. Further, the encoder of the present embodiment can provide both hard and soft information as required. As used herein, soft information refers to real, non-binary data values for decoded or demodulated bits or symbols. For example, based on the received input signal, the demodulator or decoder may determine with some inherent uncertainty that the value of a received bit is 1.2. Such a bit is more likely to be a binary 1 than a binary 0, and that information should be retained and used by the decoder. Similarly, if the demodulator determines that a bit has a value 0.8, it is less certain than in the previous case to be a 1, but still more likely a 1 than a 0. By conveying these real-valued numbers as soft information, the demodulator and decoder increase the reliability of the performance of the receiver. On the other hand, processing real numbers requires additional complexity, so a hard or binary value may be preferred. In that case, the modulators 304, 316, 320 and the decoder 308 provide hard data by quantizing the determined bit value to either a 0 or a 1 using appropriate quantization rules.

To obtain soft information about the differential symbols from the demodulator, many known methods, such as the MAP [1,2] algorithm, can be applied to the above trellis structure. The MAP algorithm is described in the following references: L. R. Bahl, J. Cocke, F. Jelinek, and J. Raviv, "Optimal Decoding of Linear Codes for Minimizing Symbol Error Rate," IEEE Transaction on Information Theory, pp. 284–287, March 1974; A. J. Viterbi, "An Intuitive justification and a Simplified Implementation of the MAP Decoder for Convolutional Codes," IEEE JSAC, vol. 16, pp. 260–264, February 1998. For example, let $M_n^f(\hat{d}_n)$ and $M_n^b(\hat{d}_n)$ denote the path metrics for state $\hat{d}_n$ during the forward run and the backward run, respectively. One may generate soft bits $\tilde{b}_n^1$ and $\tilde{b}_n^2$ for the two bits $b_n^1$ and $b_n^2$, that correspond to the differential symbol $d_n$ by $$\tilde{b}_n^i = \max_{\hat{d}_n \in A: b_n^i = +1} \{M_n^f(\hat{d}_n) + M_n^b(\hat{d}_n)\} - \max_{\hat{d}_n \in A: b_n^i = -1} \{M_n^f(\hat{d}_n) + M_n^b(\hat{d}_n)\},$$

where i=1,2. By using forward and backward path metrics, the demodulator takes into account all the samples in the received block when generating soft information.

Alternatively, one can also use other well-known simplified method of generating soft information, such as the soft-output Viterbi algorithm (SOVA) as described in J. Hagenauer and P. Hoeher, "A Viterbi algorithm with soft-decision outputs and its applications," in *Proc. IEEE GLOBECOM Conf.*, pp. 47.1.1–47.1.7, Dallas, Tex., November 1998.

The soft values are provided to the decoder. Alternatively, instead of soft values, the estimates produced by the demodulator may be quantized to binary 0 and 1 values to produce hard values, which are then provided to the decoder. Similarly, the decoder may output either hard values or soft values. The selection of hard or soft value output may be determined before processing begins or may be varied based on, for example, the current reliability of the demodulation and decoding process as determined by the receiver.

The receiver 300 of FIGS. 3 and 4 employs multipass demodulation (MPD). In a first pass through the demodulator, an estimate is made of the received data which are then conveyed to the decoder and decoded. Some of the bits, such as the 100 class 1 bits, are fed back to the demodulator and used to improve the performance of the demodulator during a second pass through the demodulator. As shown in FIG. 4, the process can be repeated for a third pass to still further improve receiver performance when receiving interleaved data.

MPD can be incorporated into the trellis-structured MSDD demodulator as follows. When a Class 1 bit $b_n^1$ is fed back from the decoder to the demodulator at stage n of the MSDD trellis during a two-pass or three-pass demodulation, two of the four states at stage n are effectively removed from the MSDD trellis. That is, no path through the removed states is further considered as a candidate. In the present implementation, such a removal of states is carried out by adding a large negative bias to the metrics of those paths that reach a state which is inconsistent with $b_n^1$, when calculating the candidate branch metric. Similarly, when the two Class 1 bits $b_n^1$ and $b_n^2$ are fed back, the number of allowable states at stage n are reduced from four to one.

Figure 6:
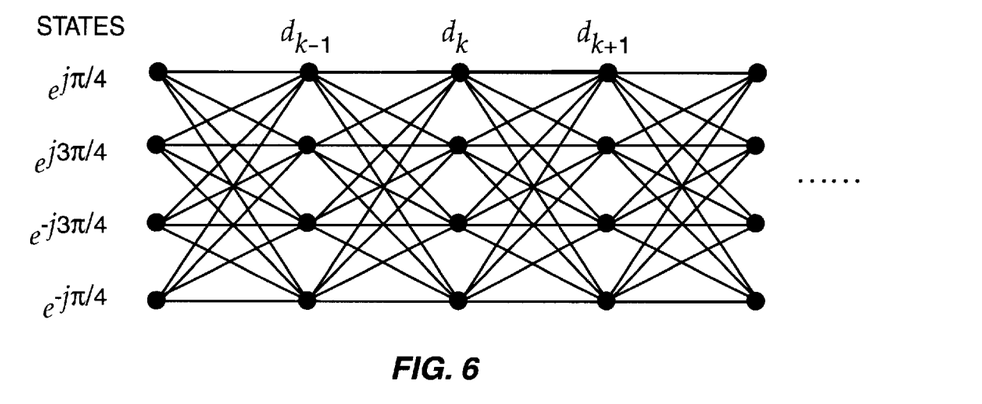
FIG. 6 is a trellis diagram of a portion of a multiple symbol differential demodulator.
Figure 7:
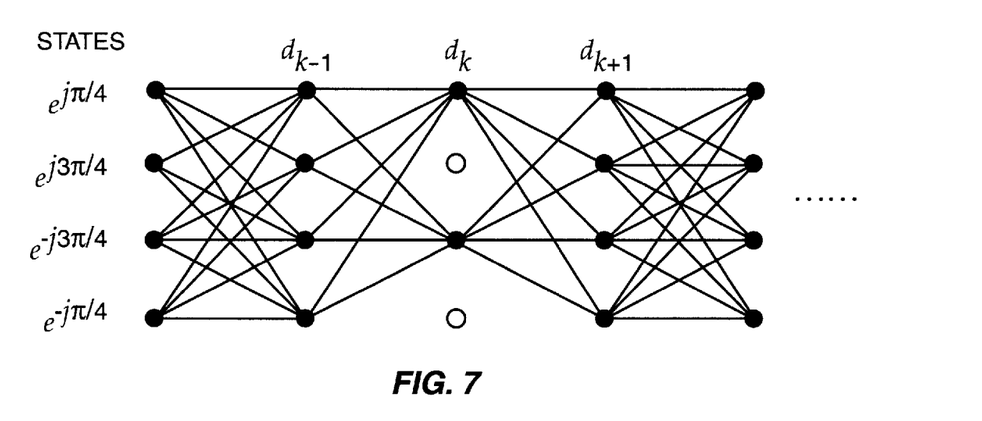
FIG. 7 is a trellis diagram of a portion of a multiple symbol differential demodulator.
Figure 8:
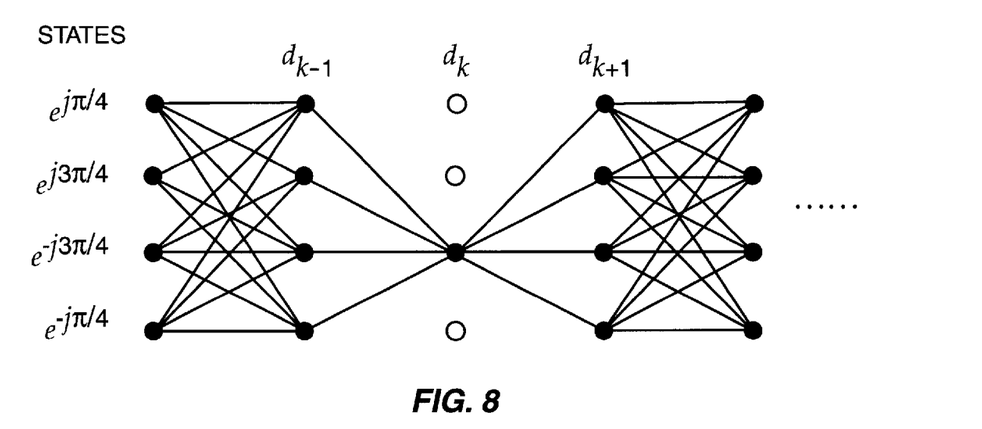
FIG. 8 is a trellis diagram of a portion of a multiple symbol differential demodulator.

FIGS. 6, 7 and 8 are trellis diagrams of a portion of a multiple symbol differential demodulator illustrating its operation when MPD is incorporated. For example, suppose each differential symbol $d_k$ in $\{e^{j\pi/4}, e^{j3\pi/4}, e^{-j3\pi/4}, e^{-j\pi/4}\}$ is mapped to one pair of bits $(b_k^1, b_k^2)$ in $\{00, 01, 10, 11\}$, and vice versa. When neither $b_k^1$, nor $b_k^2$ is known, all four possible states of $d_k$ are considered during two-pass or three-pass demodulation, as shown in FIG. 6. However, if, say, $b_k^2 = 0$ is fed back from the decoder, then the set of possible states for $d_k$ reduces to $\{e^{j\pi/4}, e^{-j3\pi/4}\}$, as shown in FIG. 7. Furthermore, if, in addition, $b_k^1=1$ is fed back, then $d_k$ is restricted to be $e^{-j3\pi/4}$ during two-pass or three-pass demodulation, as shown in FIG. 8.

Alternatively, soft values of the Class 1 bits $b_n^1$ and $b_n^2$ can also be fed back to the MSDD demodulator. In this case, the metric bias mentioned above corresponds to the logarithm of the conditional probability of $b_n^1=+1$ (or $b_n^1=-1$) given the first pass soft bit values generated by the demodulator.

From the foregoing, it can be seen that the present invention provides an improved method and apparatus for reliably receiving RF signals. The receiver implements multipass demodulation. A multiple symbol differential demodulator receives feedback from a convolutional encoder. The feedback is used to improve the quality of the demodulation during a second pass through the demodulator. Unlike the traditional Viterbi algorithm, the demodulator has both the path and the branch metrics of the trellis updated recursively from stage to stage during the demodulation process. No channel estimation is required, thereby reducing complexity of the receiver.

While a particular embodiment of the present invention has been shown and described, modifications may be made. It is therefore intended in the appended claims to cover all such changes and modifications which follow in the true spirit and scope of the invention.

What is claimed is:

1. A receiver for a communication device, comprising:
   an antenna for receiving an input signal; and
   a non-coherent trellis structured multiple sample differential demodulator (MSDD) coupled to the antenna and configured to demodulate the input signal utilizing a non-coherent demodulation trellis to produce output data;
   said MSDD comprising a recursive non-coherent trellis structured MSDD wherein one or more branch metric quantities determined by the non-coherent trellis structured MSDD is recursively updated.

2. The receiver of claim 1 further comprising:
   a convolutional decoder coupled to the non-coherent trellis structured MSDD configured to decode the output data to produce the coded data; and
   a feedback loop from the convolutional decoder to the non-coherent trellis structured MSDD.

3. The receiver of claim 2 wherein the feedback loop comprises an encoder for encoding at least some of the decoded data and providing encoded data to the non-coherent trellis structured MSDD.

4. The receiver of claim 3 further comprising a deinterleaver coupled between the non-coherent trellis structured MSDD and the convolutional decoder, the deinterleaver configured to process the output data to recover data interleaved among two or more bursts of the input signal.

5. The receiver of claim 4 further comprising a re-interleaver coupled between the encoder and the non-coherent trellis structured MSDD, the re-interleaver being configured to interleave data from the encoder in a predetermined manner.

6. The receiver of claim 1 wherein the non-coherent trellis structured MSDD comprises a plurality of sequential stages, each stage having a plurality of possible states corresponding to differential signals.

7. The receiver of claim 1 wherein the non-coherent trellis structured MSDD comprises a plurality of sequential stages, each stage having an associated state, the demodulator being configured to determine the associated state at each stage for the input signal and produce the output data in response to the determined state.

8. The receiver of claim 7 wherein the non-coherent trellis structured MSDD is configured to determine one or more metric quantities at each stage and to optimize the metric quantities to determine the associate state at each stage.

9. The receiver of claim 1 wherein the non-coherent trellis structured MSDD is configured to produce soft output data.

10. The receiver of claim 9 wherein the soft output data comprises non-binary data values.

11. The receiver of claim 2 wherein the convolutional decoder is configured to provide data to the feedback loop as non-binary data.

12. The receiver of claim 2 wherein the convolutional decoder is configured to provide data to the feedback loop as data quantized to one of a binary 0 value and a binary 1 value.

13. A method for detecting data in a radio signal, comprising the steps of:
   (a) receiving a radio frequency (RF) signal burst; and
   (b) demodulating the RF signal burst in a recursive non-coherent trellis structured multiple sample differential demodulator (MSDD) to produce output data;
   wherein one or more branch metric quantities determined by the non-coherent trellis structured MSDD is recursively updated.

14. The method of claim 13 wherein the step (b) comprises the steps of:
   (b1) establishing a non-coherent trellis structure including a plurality of sequential stages, each having a plurality of possible states;
   (b2) for each stage of the non-coherent trellis structure, optimizing a modulation metric; and
   (b3) providing states of the plurality of stages as the first pass output data.

15. The method of claim 14 wherein step (b3) comprises the step of providing the first pass output data as quantized binary values.

16. The method of claim 14 wherein step (b3) comprises the step of providing the first pass output data as real values.

17. The method of claim 14 wherein the modulation metric includes a branch metric, and step (b2) further comprises recursively calculating the branch metric.

18. The method of claim 13 wherein the output data is first pass output data, and further comprising:
   (c) decoding the first pass output data to produce data bits; and
   (d) demodulating the RF signal burst in the non-coherent trellis structured MSDD using at least some of the data bits to produce second pass bits.

19. The method of claim 18 step (d) comprises the steps of:
   (d1) establishing a non-coherent trellis structure including a plurality of sequential stages, each having a plurality of possible states;
   (d2) eliminating some of the plurality of possible states at some stages using the at least some of the data bits;
   (d3) for each stage of the non-coherent trellis structure, optimizing a modulation metric; and
   (d4) providing states of the plurality of stages as the second pass output data.

20. The method of claim 19 wherein the modulation metric includes a branch metric, and the step (d3) further comprises recursively calculating the branch metric.

21. The method of claim 18 wherein the demodulating steps (b) and (d) comprise a step of:

adapting the demodulation to a Doppler spread of the RF signal.

22. The method of claim 18 wherein the step (c) comprises the step of:
(c1) producing the data bits with soft values.

23. The method of claim 18 wherein the step (c) comprises the step of:
(c1) producing the data bits quantized to one of a binary 0 value and a binary 1 value.

24. The method of claim 18 further comprising the steps of:
(e) demodulating the RF signal burst in the MSDD to produce third pass bits.

25. The method of claim 24 wherein the second pass bits are produced substantially without delay and the third pass bits are produced with a predetermined delay.

26. The method of claim 25 wherein step (e) comprises the step of:
(e1) delaying the RF signal burst by a predetermined time duration before demodulating the RF signal burst to produce the third pass bits.

27. A radio telephone comprising:
a receiver including
an antenna for receiving an input signal from a remote radio; and
a recursive non-coherent trellis structured multiple sample differential demodulator (MSDD) configured to demodulate the input signal to produce output data;
wherein said MSDD generates branch metric values in producing the output data, where the branch metric values are recursively calculated.

28. The radio telephone of claim 27 further comprising:
a convolutional decoder coupled to the non-coherent trellis structured MSDD and configured to decode the output data to produce decoded data; and
a feedback loop from the convolutional decoder to the non-coherent trellis structured MSDD.

* * * * *